(12) United States Patent
Choi (10) Patent No.: US 6,188,523 B1
(45) Date of Patent: Feb. 13, 2001

(54) PROJECTION LENS UNIT FOR PROJECTOR

(75) Inventor: Soon-cheol Choi, Suwon (KR)

(73) Assignee: Samsung Electronics Co., Ltd., Kyungki-Do (KR)

( * ) Notice: Under 35 U.S.C. 154(b), the term of this patent shall be extended for 0 days.

(21) Appl. No.: 09/440,640

(22) Filed: Nov. 16, 1999

(51) Int. Cl.[7] ............................... G02B 3/00; G02B 9/00
(52) U.S. Cl. .............................................. 359/649; 353/69
(58) Field of Search .................................... 359/649–651, 359/754–757, 793, 795; 348/744–745; 353/69–70; 355/18, 39, 44–45, 52

(56) References Cited

U.S. PATENT DOCUMENTS

| | | | |
|---|---|---|---|
| 5,475,534 | * 12/1995 | Okajima et al. | 359/649 |
| 5,709,445 | * 1/1998 | Takamoto | 353/70 |
| 5,820,240 | * 10/1998 | Ohzawa | 353/70 |
| 5,986,806 | * 11/1999 | Sugawara | 359/557 |

* cited by examiner

Primary Examiner—Georgia Epps
Assistant Examiner—Jordan M. Schwartz
(74) Attorney, Agent, or Firm—Sughrue, Mion, Zinn, Macpeak & Seas, PLLC (57) ABSTRACT

A projection lens unit for a projector employed to a projector having a light source and a display device disposed slantingly with respect to an optical axis of light irradiated from the light source, for enlarging and projecting the light incident slantingly with respect to the optical axis via the display device is disclosed. The projection lens unit includes a first lens group having a positive power to focus incident light and arranged such that the central axis thereof is tilted with respect to the optical axis of the incident light to allow the light incident from the display device to be transmitted slantingly toward either side of the optical axis; and a second lens group having a negative power to diverge and enlarge a focused image, the first and second lens groups sequentially disposed from the display device side. The second lens group is arranged such that the optical axis thereof is coaxially disposed with the optical axis of the first lens group and has at least one aspherical lens for correcting a distortional aberration, so that the light slantingly transmitted through the first lens group diverges and is transmitted entirely with respect to the optical axis. Also, the second lens group may be disposed such that its optical axis is off-axis from the optical axis of the first lens group in the direction to which the light having passed through the first lens group is inclined.

8 Claims, 8 Drawing Sheets

PROJECTION LENS UNIT FOR PROJECTOR

BACKGROUND OF THE INVENTION

1. Field of the Invention

The present invention relates to a projection lens unit for a projector for enlarging and projecting an image on a screen, and more particularly, to a improved projection lens unit for a projector which can improve aberration characteristics and which can reduce the space occupied by lenses.

2. Description of the Related Art

In general, a projector includes a lamp for generating and irradiating light using halogen or xenon, a transmission or reflection type display device for generating an image by selectively transmitting or reflecting the light irradiated from the lamp, and a projection lens unit for enlarging an image and projecting the same on a screen. A liquid crystal display (LCD) or a micro-mirror device is be employed as the display device.

The projection lens unit must be designed in consideration of optical performance such as vertical and horizontal angle of view, aberration and the like, or space occupied by the lenses in the projector.

Taking this into consideration, the present applicant previously proposed a projection lens unit which is filed on Jan. 24, 1996 in Korean patent application No. 1858 (invented by Dong-ha Kim in the title of Wide View-Angle Liquid Crystal Projection Lens System).

The proposed projection lens unit includes a prism for switching the angle of an optical axis to arrange the optical axis to be bent by 90° or greater, thereby reducing the space occupied in the projector and achieving a wide angle of view.

However, since the respective lens groups have circular shapes, there is a limit in reducing the space occupied thereby.

Also, in "Reflection Type Projecting Apparatus" proposed by the present applicant, U.S. Ser. No. 09/057,585 filed on Apr. 9, 1998, invented by Soon-chul Choi, light is made to be incident or reflected slantingly into or from a ferroelectric liquid crystal device (FLCD) using a critical angle prism to convert the traveling path of the light. Accordingly, in the case where a conventional projection lens unit which is widely known is employed, the light reflected from the FLCD travels slantingly with respect to the optical axis of the projection lens unit, thereby causing deterioration in contrast and aberration characteristics of an image formed on a screen.

SUMMARY OF THE INVENTION

To solve the above problems, it is an objective of the present invention to provide an improved projection lens unit for a projector which can reduce a space occupied by an optical system by using only substantially half region of a lens group and can change the traveling path of light incident slantingly with respect to the optical axis of incident light.

Accordingly, to achieve the above objective, there is provided a projection lens unit for a projector employed to a projector having a light source and a display device disposed slantingly with respect to an optical axis of light irradiated from the Is light source, for enlarging and projecting the light incident slantingly with respect to the optical axis via the display device, the projection lens unit including: a first lens group having a positive power to focus incident light and arranged such that the central axis thereof is tilted with respect to the optical axis of the incident light to allow the light incident from the display device to be transmitted slantingly toward either side of the optical axis; and a second lens group having a negative power to diverge and enlarge a focused image, arranged such that the optical axis thereof is coaxially disposed with the optical axis of the first lens group and the second lens group having at least one aspherical lens for correcting a distortional aberration, the second lens group for diverging and transmitting the light having passed through the first lens group slantingly in view of the optical axis, the first and second lens groups sequentially disposed from the display device side.

According to another aspect of the present invention, there is provided a projection lens unit for a projector employed to a projector having a light source and a display device disposed slantingly with respect to an optical axis of light irradiated from the light source, for enlarging and projecting the light incident slantingly with respect to the optical axis via the display device, the projection lens unit including: a first lens group having a positive power to focus incident light and arranged such that the central axis thereof is tilted with respect to the optical axis of the incident light to allow the light incident from the display device to be transmitted slantingly toward either side of the optical axis; and a second lens group having a negative power to diverge and enlarge a focused image, arranged such that the optical axis thereof is off-axis from the optical axis of the first lens group slantingly with respect to the light transmitted through the first lens group, the first and second lens groups sequentially disposed from the display device side.

DESCRIPTION OF THE PREFERRED EMBODIMENTS

Figure 1:
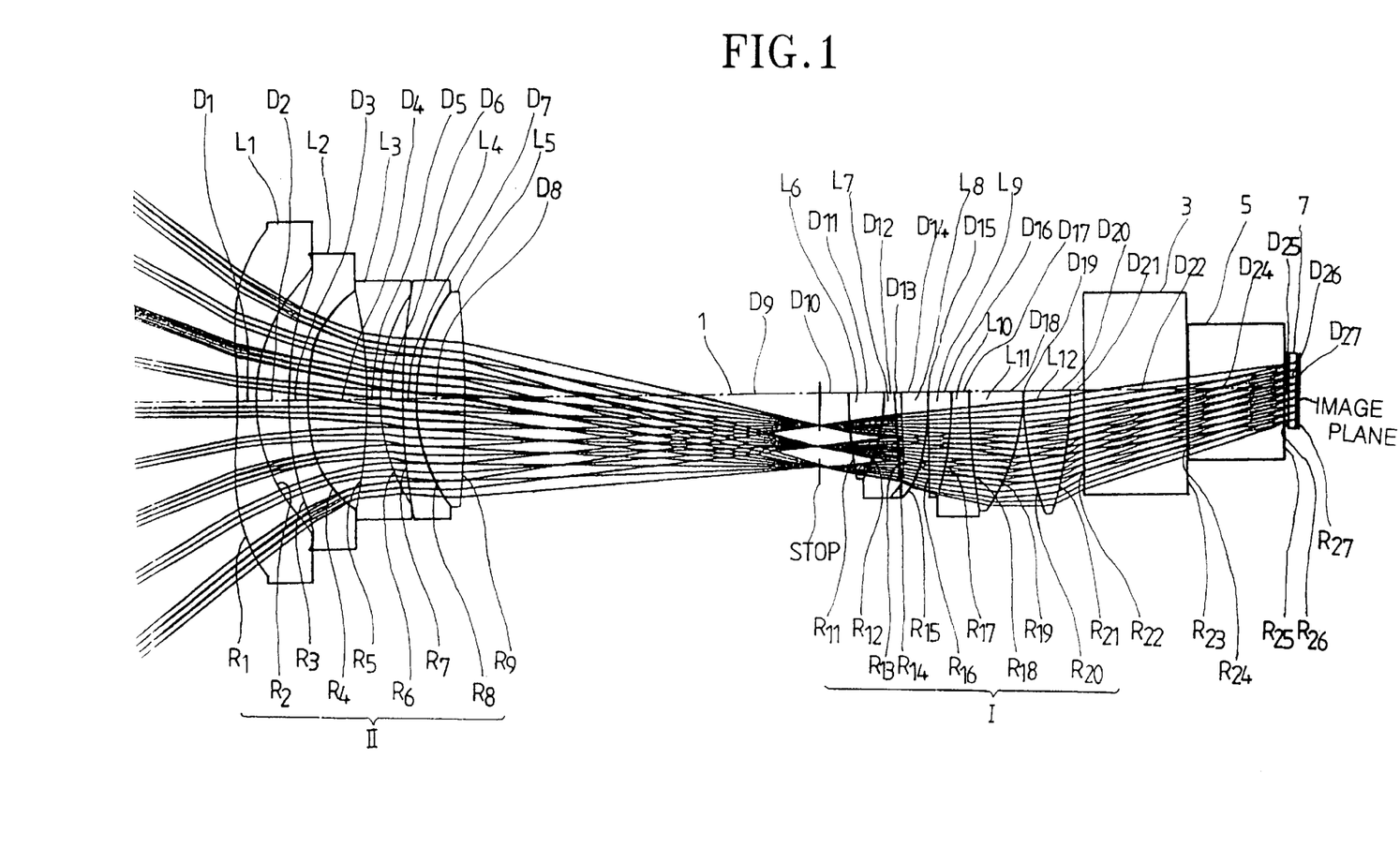
FIG. 1 is a schematic diagram illustrating the optical arrangement of a projection lens unit for a projector according to a first embodiment of the present invention.

Referring to FIG. 1, a projection lens unit tor a projector according to a first embodiment of the present invention, which is employed to a projector having a light source and a display device, enlarges and projects light incident slantingly with respect to an optical axis via the display device, and includes a first lens group (I) and a second lens group (II) sequentially disposed from the display device side (an image plane of FIG. 1).

Here, the projection lens unit substantially irradiates an image from the first lens group (I) to the second lens group (II). However, in the lens architecture, the light is irradiated from the second lens group (II), passes through the first lens group (I) and then forms an image on an image plane where the display device is positioned. Thus, the projection lens unit shown in FIG. 1 includes the second lens group (II) and the first lens group (I) sequentially disposed from the left side of the drawing.

The first lens group (I) has a positive (+) power to focus incident light. To this end, the first lens group (I) consists of four convex lenses $L_6$, $L_9$, $L_{11}$ and $L_{12}$, and two concave lens $L_7$ and $L_{10}$. The first lens group (I) is for correcting modulation of the light incident slantingly with respect to its optical axis, and is arranged such that the light generated from the display device and incident via a third optical element 7, a second optical element 5 and a first optical element 3, is transmitted slantingly toward either side of the optical axis 1.

Thus, in view of the optical axis 1, about half of the first lens group (I) is unused, and the first lens group (I) preferably has a semi-cylindrical shape in which the unused part is cut. In this case, the space occupied by the first lens group (I) usually positioned in the projector can be reduced.

The second lens group (II) has a negative (−) power to diverge and enlarge a focused image. The second lens group (II) consists of a convex lens $L_5$, a concave lens $L_3$, a meniscus lens $L_4$ and two aspherical lenses $L_1$ and $L_2$, in view of a wide angle of view and aberration characteristics, and the optical axis thereof is coaxially positioned with the optical axis of the first lens group (I). Here, the light transmitted through the first lens group (I) slantingly, is transmitted throughout the second lens group (II).

A stop is preferably provided at a position deviated from the optical axis between the first lens group (I) and the second lens group (II) so as to shield the light having an abnormal path due to aberration.

Tables 1 and 2 list radii of curvature of various lenses constituting the aforementioned first lens group (I) and second lens group (II), thicknesses thereof. distances between the respective lenses, refractive indices and dispersions.

Here, the lenses $L_1$, $L_2$ and $L_8$ are aspherical lenses, respectively, and satisfy the following aspherical surface formulas represented by:

$$Z = \frac{ch^2}{1 + [1 - (1+k)c^2h^2]^{1/2}} + Ah^4 + Bh^6 + Ch^8 + Dh^{10} + \cdots \quad (1)$$

where Z is the sag from a lens point at a position spaced apart from the optical lens of each lens unit by a height h, c is the curvature of the lens at the optical axis which is an inverse number of the radius of curvature, k is a conic constant, A, B, C and D aspherical coefficients of the respective lenses, respectively. Although the conic constant k is substantially different according to the lenses, it is set to 0 in FIG. 1, for accurate design of a lens.

TABLE 1

| Lens | Radius of curvature (mm) | Lens (Optical element) thickness or distance (mm) | Refractive index | Dispersion |
|---|---|---|---|---|
| $L_1$ | R1 = −156.001 (Aspherical surface 1) | D1 = 5.500 | 1.492 | 57.1 |
|  | R2 = 45.170 (Aspherical surface 2) | D2 = 9.556 |  |  |
| $L_2$ | R3 = 110.088 (Aspherical surface 3) | D3 = 5.500 | 1.492 | 57.1 |
|  | R4 = 88.419 (Aspherical surface 4) | D4 = 17.333 |  |  |
| $L_3$ | R5 = −155.010 | D5 = 4.000 | 1.620 | 60.3 |
|  | R6 = 55.323 | D6 = 6.734 |  |  |
| $L_4$ | R7 = 190.024 | D7 = 4.000 | 1.620 | 60.3 |
| $L_5$ | R8 = 52.354 | D8 = 14.378 | 1.805 | 25.5 |
|  | R9 = −304.031 | D9 = 104.515 |  |  |
| Stop | ∞ | D10 = 8.635 |  |  |
| $L_6$ | R11 = 127.538 | D11 = 10.256 | 1.487 | 70.4 |
| $L_7$ | R12 = −50.410 | D12 = 3.500 | 1.805 | 40.7 |
|  | R13 = 242.605 | D13 = 1.754 |  |  |
| $L_8$ | R14 = 173.386 (Aspherical surface 5) | D14 = 7.821 | 1.492 | 57.1 |
|  | R15 = 85.233 (Aspherical surface 6) | D15 = 0.100 |  |  |
| $L_9$ | R16 = ∞ | D16 = 6.703 | 1.603 | 60.7 |
| $L_{10}$ | R17 = −103.411 | D17 = 5.000 | 1.755 | 27.5 |
| $L_{11}$ | R18 = 193.170 | D18 = 15.876 | 1.603 | 60.7 |
|  | R19 = 56.917 | D19 = 0.100 |  |  |
| $L_{12}$ | R20 = 98.248 | D20 = 13.740 | 1.658 | 50.9 |
|  | R21 = −109.062 | D21 = 4.000 |  |  |
| First optical element | R22 = ∞ R23 = ∞ | D22 = 30.980 D23 = 0.510 | 1.517 | 64.2 |
| Second optical element | R24 = ∞ R25 = ∞ | D24 = 28.310 D25 = 1.235 | 1.517 | 64.2 |
| Third optical element | R26 = ∞ R27 = ∞ | D26 = 2.212 D27 = 0.001 | 1.523 | 63.0 |

The aspherical coefficients of the aspherical lenses are listed in Table 2.

TABLE 2

|  | Aspherical coefficient | | | |
|---|---|---|---|---|
|  | A | B | C | D |
| Aspherical surface | $0.442734 \times 10^{-5}$ | $-0.947434 \times 10^{-9}$ | $0.791505 \times 10^{-13}$ | $0.814146 \times 10^{-17}$ |
| Aspherical surface | $-0.531291 \times 10^{-5}$ | $0.504292 \times 10^{-8}$ | $-0.380461 \times 10^{-12}$ | $-0.116628 \times 10^{-14}$ |
| Aspherical surface | $0.878162 \times 10^{-6}$ | $0.506836 \times 10^{-9}$ | $-0.498960 \times 10^{-12}$ | $-0.157898 \times 10^{-15}$ |
| Aspherical surface | $0.959810 \times 10^{-5}$ | $-0.405771 \times 10^{-9}$ | $-0.467661 \times 10^{-11}$ | $0.364543 \times 10^{-14}$ |

TABLE 2-continued

| | Aspherical coefficient | | | |
|---|---|---|---|---|
| | A | B | C | D |
| Aspherical surface | $0.259442 \times 10^{-5}$ | $-0.325740 \times 10^{-8}$ | $0.233931 \times 10^{-11}$ | $-0.678575 \times 10^{-14}$ |
| Aspherical surface | $0.103037 \times 10^{-5}$ | $-0.207257 \times 10^{-8}$ | $0.473880 \times 10^{-12}$ | $-0.409657 \times 10^{-14}$ |

The first lens group (I) and the second lens group (II) are sufficiently spaced apart from each other for easy optical arrangement, as compared to lenses constituting the respective lens groups.

Figure 2:
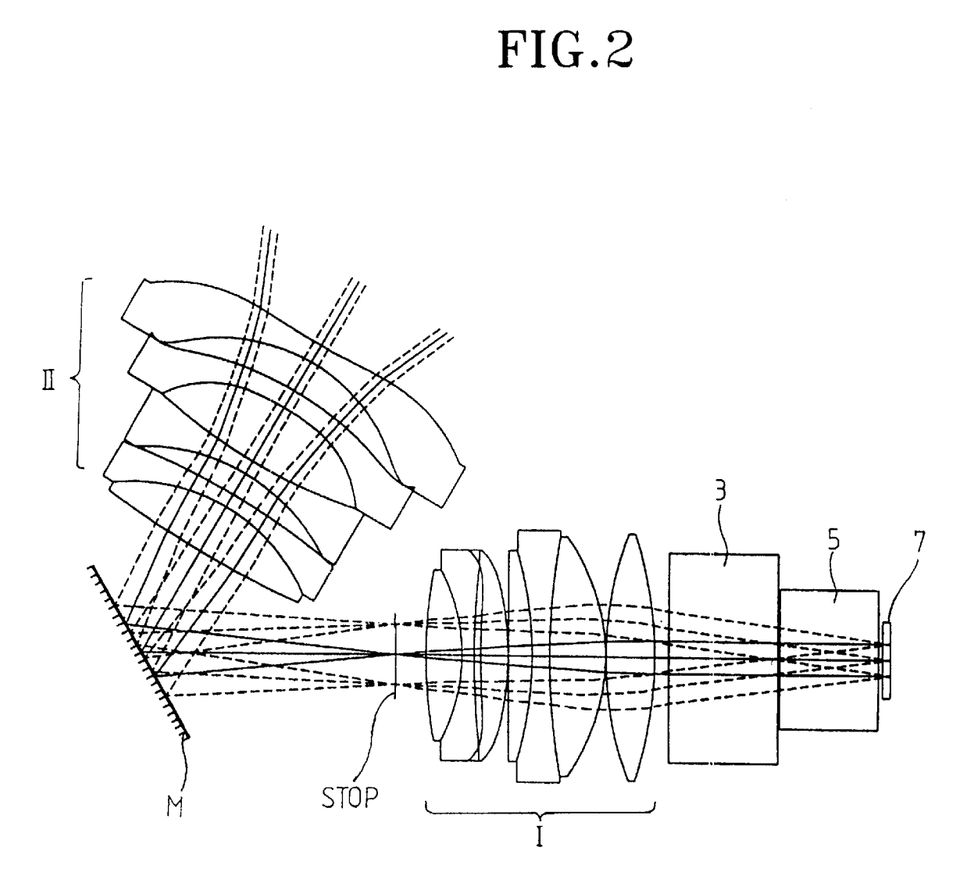
FIG. 2 is a schematic diagram illustrating the optical arrangement of a projection lens unit for a projector according to a second embodiment of the present invention.

In this case, as shown in FIG. 2, there may be provided a reflecting mirror (M) disposed on a light path between the first lens group (I) and the second lens group (II), for reflecting a received image and changing the traveling path thereof. Here, the optical arrangement can be easily achieved in a narrow space by changing the light path using the reflecting mirror (M).

FIGS. 3 through 6 are diagrams showing aberration characteristics of the projection lens unit for a projector shown in FIG. 1.

Figure 3A:
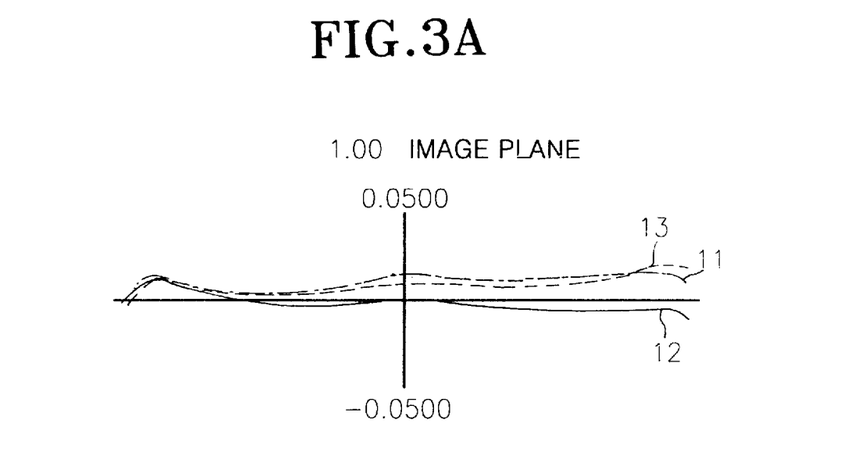
FIGS. 3A, 3B, and 3C are aberration diagrams of a tangential plane of the projection lens unit for a projector shown in FIG. 1.
Figure 3B:
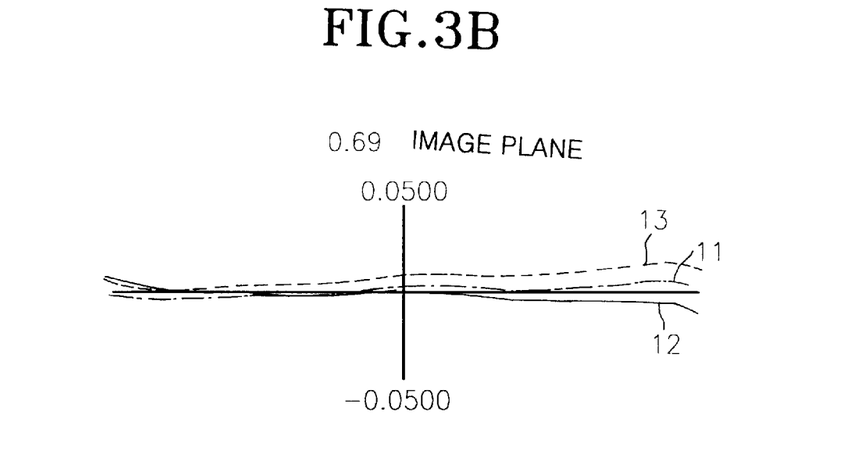
Figure 3C:
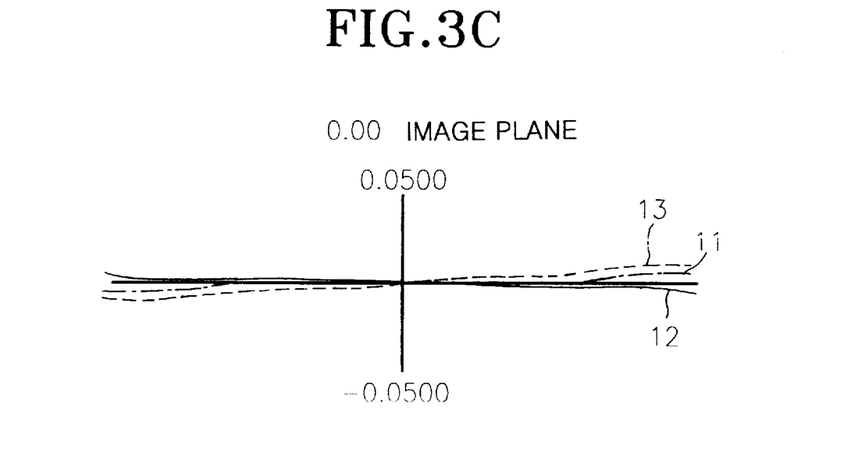

FIGS. 3A through 3C show tangential aberrations of light rays having different wavelengths. In other words, an aberration 11 of a light ray having a wavelength of 460.0 nm, an aberration 12 of a light ray having a wavelength of 550.0 nm and an aberration 13 of a light ray having a wavelength of 640.0 nm are shown for a 1.00 image plane, a 0.69 image plane and a 0.99 image plane, respectively.

Figure 4A:
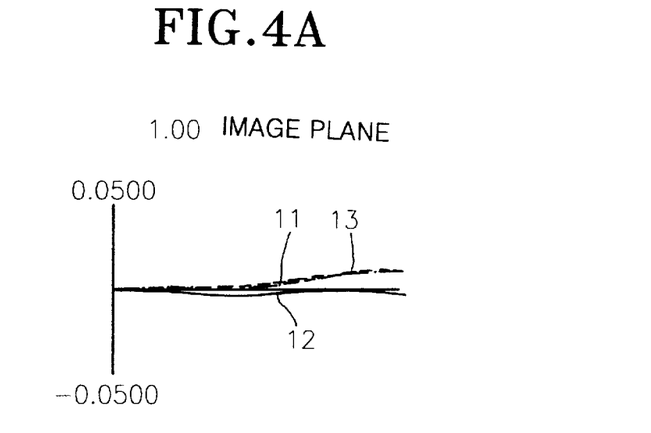
FIGS. 4A, 4B, and 4C are aberration diagrams of a sagittal plane of the projection lens unit for a projector shown in FIG. 1.
Figure 4B:
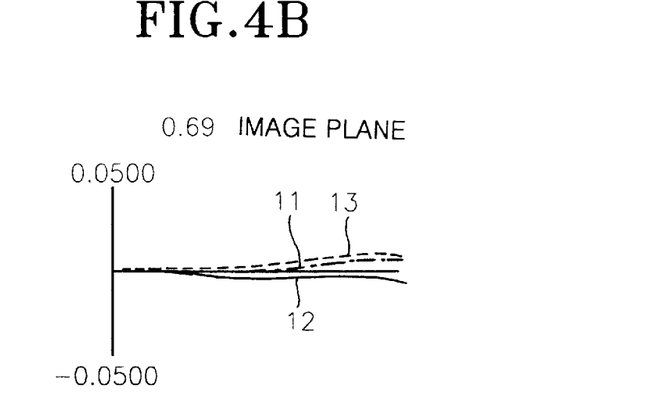
Figure 4C:
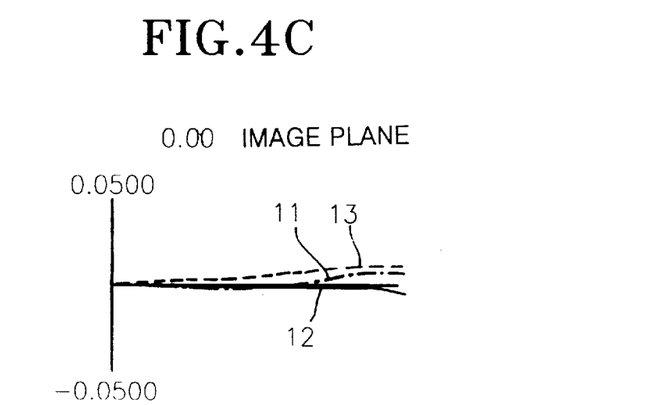

FIGS. 4A through 4C show sagittal aberrations of light rays having different wavelengths. In other words, an aberration 11 of a light ray having a wavelength of 460.0 nm, an aberration 12 of a light ray having a wavelength of 550.0 nm and an aberration 13 of a light ray having a wavelength of 640.0 nm are shown for a 1.00 image plane, a 0.69 image plane and a 0.99 image plane, respectively.

Figure 5:
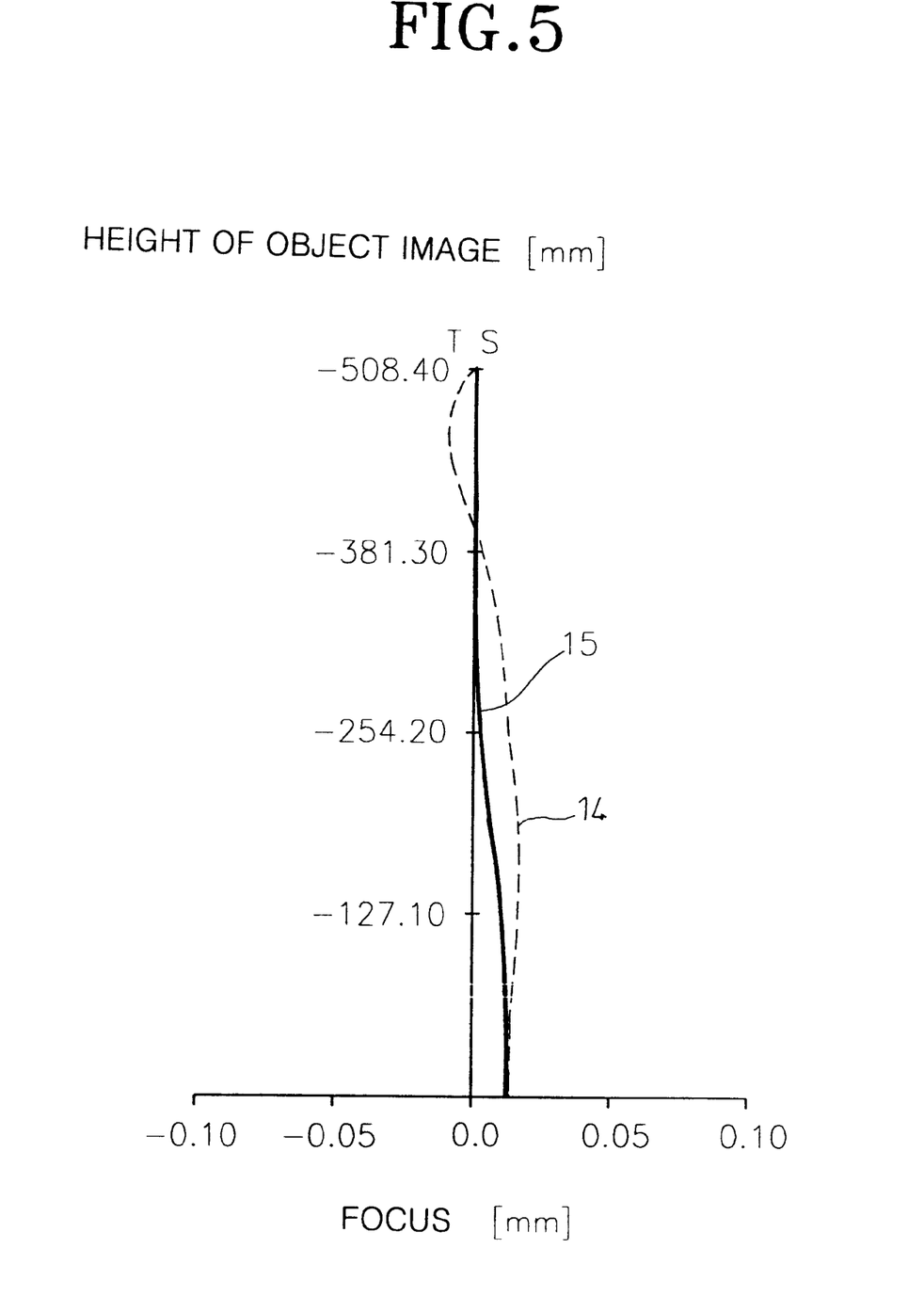
FIG. 5 is an aberration diagram of astigmatism of the projection lens unit for a projector shown in FIG. 1.

FIG. 5 is an aberration diagram of astigmatism, showing a tangential field curvature (T) 14 and a sagittal field curvature 11 at a height of an object image depending on focus.

Figure 6:
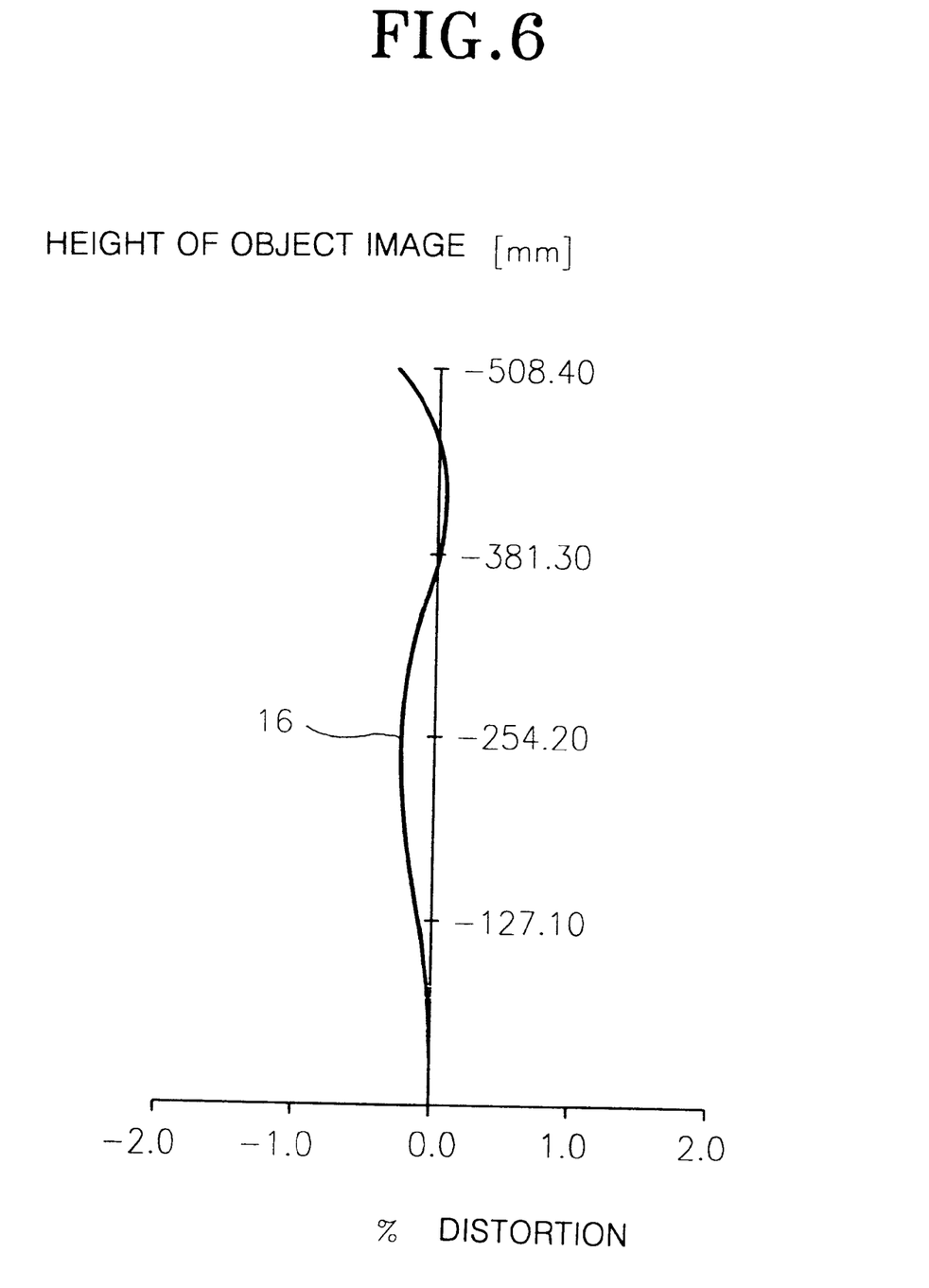
FIG. 6 is an aberration diagram of a distortion of the projection lens unit for a projector shown in FIG. 1.

FIG. 6 is an aberration diagram of a distortion 16.

The aforementioned projection lens units for a projector according to first and second embodiments of the present invention allow an image incident slantingly into the first lens group (I) to be properly projected on a screen, thereby greatly improving contrast and aberration characteristics. Also, unused parts produced by using the first lens group only partially in view of the optical axis thereof are removed, thereby reducing the space occupied in the projector.

Figure 7:
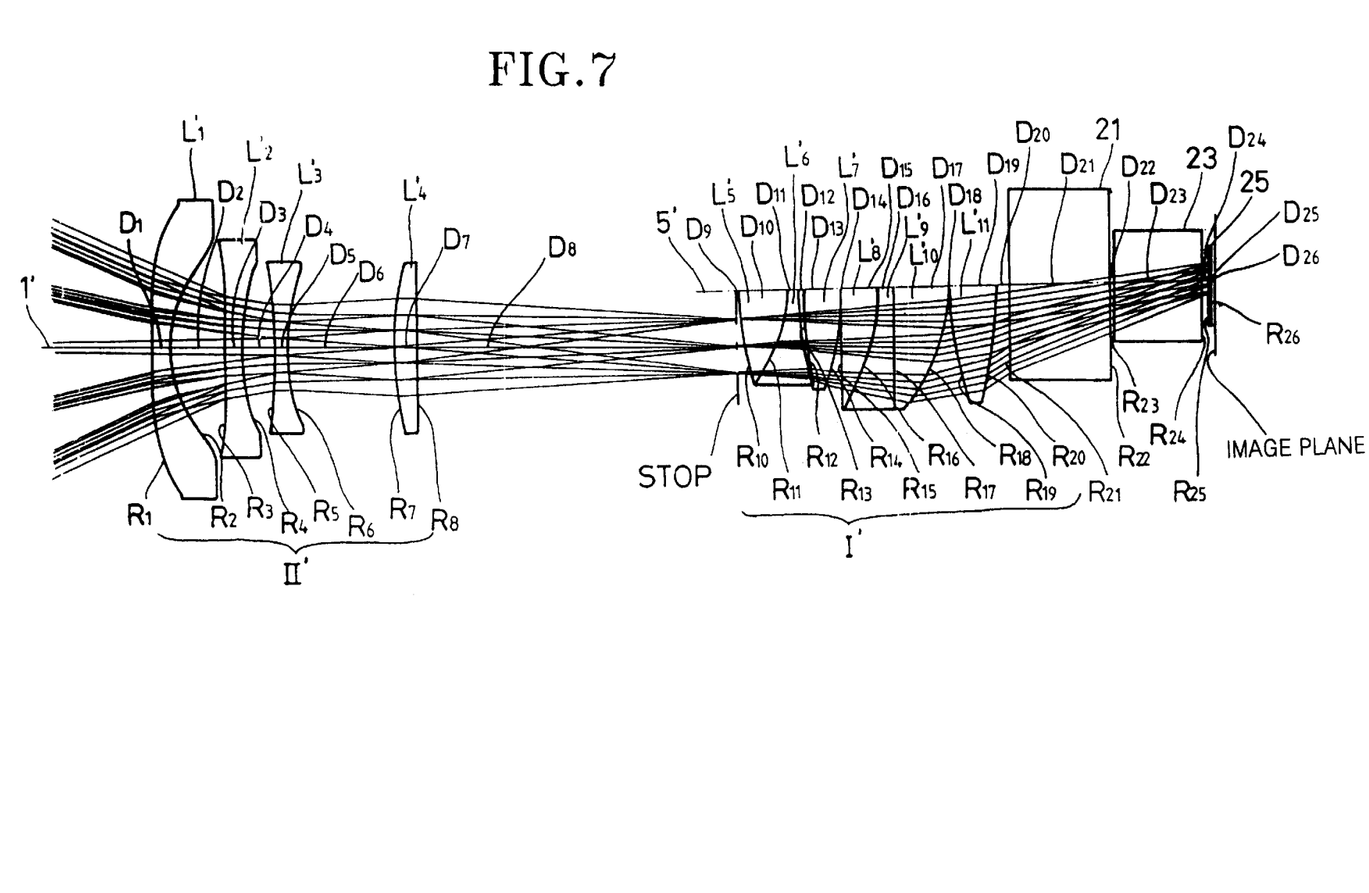
FIG. 7 is a schematic diagram illustrating the optical arrangement of a projection lens unit for a projector according to a third embodiment of the present invention.

Referring to FIG. 7, a projection lens unit for a projector according to a third embodiment of the present invention includes a first lens group (I') and a second lens group (II') sequentially disposed from a displace device side (an image plane of FIG. 3).

The first lens group (I') has a positive (+) power to focus incident light. To this end, the first lens group (I') consists of four convex lenses $L_5'$, $L_8'$, $L_{10}'$ and $L_{11}'$, two concave lenses $L_6'$ and $L_9'$ and an aspherical lens $L_7'$. The first lens group (I') is for correcting modulation of the light incident slantingly with respect to its optical axis 5', and is arranged such that the light generated from the display device and incident via a third optical element 25, a second optical element 23 and a first optical element 21, is transmitted slantingly toward either side of the optical axis 5'.

Thus, in view of the optical axis 5', about half of the first lens group (I) is unused, and the first lens group (I') preferably has a semi-cylindrical shape in which the unused part is cut. In this case, the space occupied by the first lens group (I') usually positioned in the projector can be reduced.

The second lens group (II') has a negative (-) power to diverge and enlarge a focused image. The second lens group (II') consists of a convex lens $L_4'$, a concave lens $L_3'$ and two aspherical lenses $L_1'$ and $L_2'$, in view of a wide angle of view and aberration characteristics, and the optical axis 1' of the second lens group (II') is off-axis from the optical axis 5' of the first lens group (I') by a predetermined distance in the direction to which the light transmitted through the first lens group (I') is inclined.

FIG. 7 shows the case in which the optical axis 1' of the second lens group (II') is off-axis from the optical axis 5' of the first lens group (I') by 18.000 mm. Meanwhile, the second lens group (II') may have a non-rotational asymmetric shape for correcting astigmatism and coma aberration due to deviation of the optical axis 1' of the second lens group (II') from the optical axis 5' of the first lens group (I').

A stop is preferably provided between the first lens group (I') and the second lens group (II') so as to shield the light having an abnormal path due to aberration.

Tables 3 and 4 list radii of curvature of various lenses constituting the aforementioned first lens group (I') and second lens group (II'), thicknesses thereof, distances between the respective lenses, refractive indices and dispersions.

Here, the lenses $L_1'$, $L_2'$ and $L_7'$ are aspherical lenses, respectively, and satisfy the following aspherical surface formula represented by Expression (1). FIG. 7 shows the case in which the conic constant is set to 0.000, for accurate design of a lens.

TABLE 3

| Lens | Radius of curvature (mm) | Lens (Optical element) thickness or distance (mm) | Refractive index | Dispersion |
|---|---|---|---|---|
| $L_1'$ | R1 = -329.317 (Aspherical surface 1) | D1 = 5.500 | 1.492 | 57.1 |
| | R2 = 38.141 (Aspherical surface 2) | D2 = 16.157 | | |
| $L_2'$ | R3 = 157.637 (Aspherical surface 3) | D3 = 5.500 | 1.492 | 57.1 |
| | R4 = 82.975 (Aspherical surface 4) | D4 = 10.458 | | |
| $L_3'$ | R5 = -124.470 | D5 = 3.500 | 1.603 | 60.7 |
| | R6 = 61.627 | D6 = 32.645 | | |
| $L_4'$ | R7 = 108.304 | D7 = 6.880 | 1.923 | 20.9 |
| | R8 = ∞ | D8 = 96.448 | | |
| Stop | ∞ | D9 = 0.867 | | |
| $L_5'$ | R10 = 96.969 | D10 = 14.956 | 1.497 | 81.6 |
| $L_6'$ | R11 = -46.354 | D11 = 3.500 | 1.806 | 40.7 |
| | R12 = 115.154 | D12 = 1.488 | | |
| $L_7'$ | R13 = 106.630 | D13 = 11.321 | 1.492 | 57.1 |

TABLE 3-continued

| Lens | Radius of curvature (mm) | Lens (Optical element) thickness or distance (mm) | Refractive index | Dispersion |
|---|---|---|---|---|
| | (Aspherical surface 5) R14 = −76.609 (Aspherical surface 6) | D14 = 0.100 | | |
| $L_8'$ | R15 = ∞ | D15 = 11.403 | 1.603 | 60.7 |
| $L_9'$ | R16 = −66.319 | D16 = 4.500 | 1.755 | 27.5 |
| $L_{10}'$ | R17 = ∞ | D17 = 16.876 | 1.603 | 60.7 |
| | R18 = −55.738 | D18 = 0.100 | | |
| $L_{11}'$ | R19 = 105.067 | D19 = 14.440 | 1.670 | 47.2 |
| | R20 = −124.434 | D20 = 4.000 | | |
| First optical element | R21 = ∞ R22 = ∞ | D21 = 30.741 D22 = 1.034 | 1.517 | 64.2 |
| Second optical element | R23 = ∞ R24 = ∞ | D23 = 27.184 D24 = 1.843 | 1.517 | 64.2 |
| Third optical element | R25 = ∞ R26 = ∞ | D25 = 0.675 D26 = 0.001 | 1.523 | 63.0 |

The aspherical coefficients of the aspherical lenses are listed in Table 4.

TABLE 4

| | Aspherical coefficient | | | |
|---|---|---|---|---|
| | A | B | C | D |
| Aspherical surface 1 | $0.664015 \times 10^{-5}$ | $-0.356449 \times 10^{-8}$ | $0.118344 \times 10^{-11}$ | $-0.973954 \times 10^{-16}$ |
| Aspherical surface 2 | $-0.777681 \times 10^{-6}$ | $0.641805 \times 10^{-8}$ | $-0.123508 \times 10^{-10}$ | $0.313638 \times 10^{-14}$ |
| Aspherical surface 3 | $-0.705832 \times 10^{-5}$ | $0.252548 \times 10^{-8}$ | $-0.272325 \times 10^{-12}$ | $0.172113 \times 10^{-15}$ |
| Aspherical surface 4 | $-0.164658 \times 10^{-5}$ | $0.382232 \times 10^{-8}$ | $-0.122384 \times 10^{-11}$ | $0.794269 \times 10^{-14}$ |
| Aspherical surface 5 | $-0.683769 \times 10^{-6}$ | $-0.325706 \times 10^{-8}$ | $0.638592 \times 10^{-11}$ | $-0.540434 \times 10^{-14}$ |
| Aspherical surface 6 | $0.266751 \times 10^{-5}$ | $-0.239591 \times 10^{-8}$ | $0.530429 \times 10^{-11}$ | $-0.429706 \times 10^{-14}$ |

The first lens group (I') and the second lens group (II') are sufficiently spaced apart from each other for easy optical arrangement, as compared to lenses constituting the respective lens groups.

Figure 8:
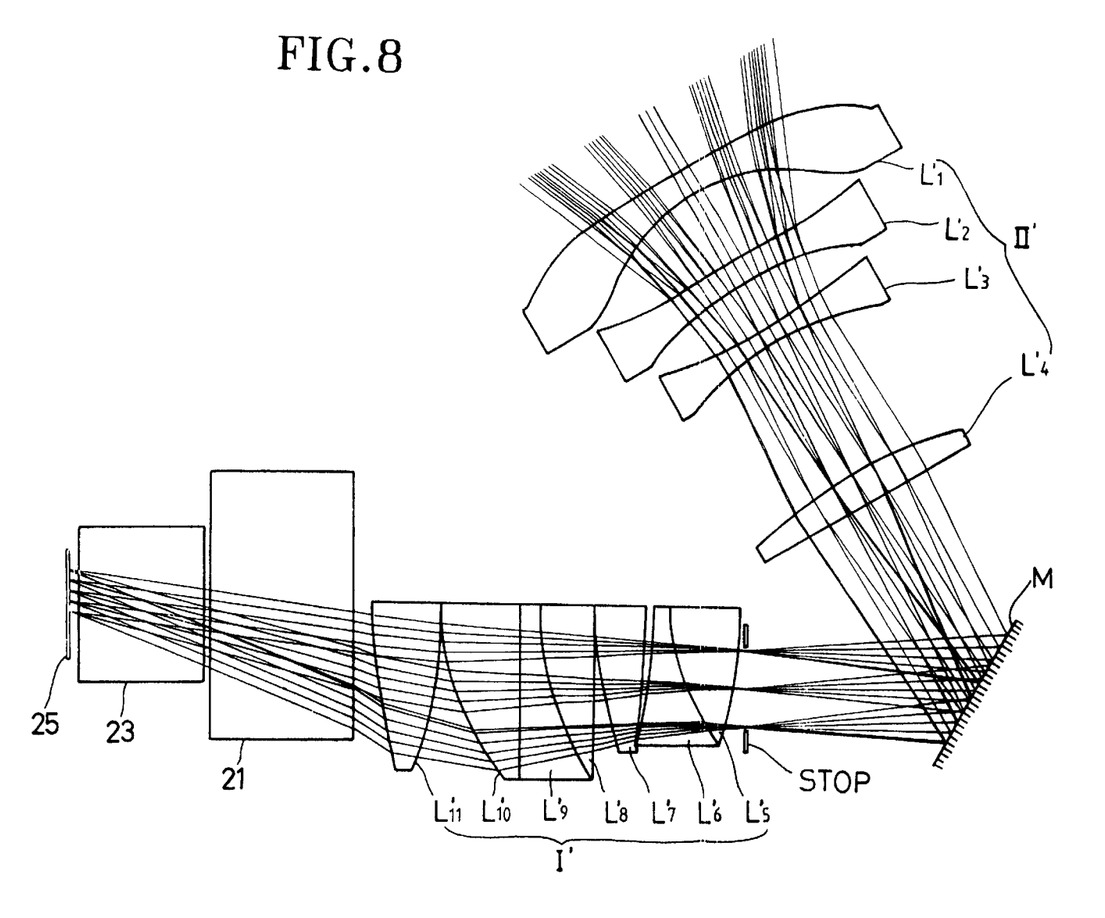
FIG. 8 is a schematic diagram illustrating the optical arrangement of a projection lens unit for a projector according to a fourth embodiment of the present invention.

In this case, as shown in FIG. 8, there may be provided a reflecting mirror (M') disposed on a light path between the first lens group (I') and the second lens group (II'), for reflecting a received image and changing the traveling path thereof, thereby facilitating optical arrangement. FIG. 8 illustrates an example of irradiating light from a projector and projecting the same on a screen (not shown).

The aforementioned projection lens units for a projector according to third and fourth embodiments of the present invention allow an image incident slantingly into the first lens group (I) to be properly projected on a screen by arranging the optical axis 1' of the second lens group (II') to be off-axis from the optical axis 5' of the first lens group (I'), thereby greatly improving contrast and aberration characteristics. Also, unused parts produced by using the first lens group only partially in view of the optical axis thereof are removed, thereby reducing the space occupied in the projector.

What is claimed is:

1. A projection lens unit for a projector employed to a projector having a light source and a display device disposed slantingly with respect to an optical axis of light irradiated from the light source, for enlarging and projecting the light incident slantingly with respect to the optical axis via the display device, the projection lens unit comprising:

a first lens group having a positive power to focus incident light and arranged such that the central axis thereof is tilted with respect to the optical axis of the incident light to allow the light incident from the display device to be transmitted slantingly toward either side of the optical axis; and a second lens group having a negative power to diverge and enlarge a focused image, arranged such that the optical axis thereof is coaxially disposed with the optical axis of the first lens group and the second lens group having at least one aspherical lens for correcting a distortional aberration, the second lens group for diverging and transmitting the light, which has slantingly passed through the first lens group, entirely with respect to the optical axis of the incident light, the first and second lens groups sequentially disposed from the display device side.

2. The projection lens unit for a projector according to claim 1, wherein the respective lenses of the first lens group have semi-cylindrical shapes in which with respect to the optical axis of the incident light, substantially half of the lenses are cut.

3. The projection lens unit for a projector according to claim 1, further comprising a stop disposed at a position deviated from the optical axis of the incident light on a light path between the first lens group and the second lens group.

4. The projection lens unit for a projector according to claim 1, further comprising a reflecting mirror disposed on a light path between the first lens group and the second lens group, for reflecting an incident image and changing the traveling path thereof.

5. A projection lens unit for a projector employed to a projector having a light source and a display device disposed slantingly with respect to an optical axis of light irradiated from the light source, for enlarging and projecting the light incident slantingly with respect to the optical axis via the display device, the projection lens unit comprising:

a first lens group having a positive power to focus incident light and arranged such that the central axis thereof is tilted with respect to the optical axis of the incident light to allow the light incident from the display device to be transmitted slantingly toward either side of the optical axis; and a second lens group having a negative power to diverge and enlarge a focused image, arranged such that the optical axis thereof is off-axis from the optical axis of the first lens group in the direction to which the light transmitted through the first lens group is inclined, the first and second lens groups sequentially disposed from the display device side.

6. The projection lens unit for a projector according to claim 5, wherein the respective lenses of the first lens group have semi-cylindrical shapes in which with respect to optical axis of the incident light, substantially half of the lenses are cut.

7. The projection lens unit for a projector according to claim 5, further comprising a stop disposed on a light path between the first lens group and the second lens group.

8. The projection lens unit for a projector according to claim 5, further comprising a reflecting mirror disposed on a light path between the first lens group and the second lens group, for reflecting an incident image and changing the traveling path thereof.

* * * * *